United States Patent
Mancini

(10) Patent No.: US 11,092,220 B1
(45) Date of Patent: Aug. 17, 2021

(54) REDUNDANT, FAULT TOLERANT TRACTION DRIVE AXLE FOR VEHICLE

(71) Applicant: BAE Systems Controls Inc., Endicott, NY (US)

(72) Inventor: Bart W. Mancini, Newark Valley, NY (US)

(73) Assignee: BAE Systems Controls Inc., Endicott, NY (US)

(*) Notice: Subject to any disclaimer, the term of this patent is extended or adjusted under 35 U.S.C. 154(b) by 0 days.

(21) Appl. No.: 16/769,476

(22) PCT Filed: Sep. 19, 2019

(86) PCT No.: PCT/US2019/051871
§ 371 (c)(1),
(2) Date: Jun. 3, 2020

(87) PCT Pub. No.: WO2021/054958
PCT Pub. Date: Mar. 25, 2021

(51) Int. Cl.
*F16H 37/08* (2006.01)
*B60K 6/26* (2007.10)
(Continued)

(52) U.S. Cl.
CPC ........... *F16H 37/0826* (2013.01); *B60K 1/02* (2013.01); *B60K 6/26* (2013.01); *B60K 6/28* (2013.01);
(Continued)

(58) Field of Classification Search
CPC ............. F16H 37/0826; F16H 2702/04; F16H 2057/02034; F16H 2057/02052;
(Continued)

(56) References Cited

U.S. PATENT DOCUMENTS

| 2,195,783 A | 2/1940 | Ravigneaux |
| 9,623,872 B2 * | 4/2017 | Zhu ................... B60W 10/08 |

(Continued)

FOREIGN PATENT DOCUMENTS

| CN | 106553510 A * | 4/2017 | ............. B60K 1/02 |
| CN | 109927530 A | 6/2019 | |

(Continued)

OTHER PUBLICATIONS

International Search Report, PCT/US19/51871, 7 pages, dated Dec. 13, 2019.

*Primary Examiner* — Dirk Wright
(74) *Attorney, Agent, or Firm* — Scott J. Asmus; Scully Scott Murphy & Presser PC

(57) ABSTRACT

A system for a vehicle is disclosed. The system comprises a gear box. The gear box comprises a first shaft coupled to a first motor and a second shaft coupled to the second motor and a third shift. Each shaft extends through a respective pinion. The gearbox has a first shifter for the first motor and a second shifter for the second motor. The shifters are configured to selectively engage a respective pinion to an appropriate shaft as needed. The gear box further comprises a fourth shaft extending through a first gear and a second gear and an other pinion. The first gear meshes with a first pinion. The second gear meshes with a second pinion. The other pinion meshes with a third pinion and a fourth gear. A differential is mechanically coupled to the fourth gear and a left axle shaft and a right axle shaft.

16 Claims, 10 Drawing Sheets

(51) Int. Cl.
*B60K 1/02* (2006.01)
*B60K 6/365* (2007.10)
*B60K 6/547* (2007.10)
*B60L 50/60* (2019.01)
*B60K 17/08* (2006.01)
*B60K 6/28* (2007.10)
*F16H 57/02* (2012.01)

(52) U.S. Cl.
CPC .............. *B60K 6/365* (2013.01); *B60K 6/547* (2013.01); *B60K 17/08* (2013.01); *B60L 50/60* (2019.02); *B60L 2210/40* (2013.01); *B60Y 2200/91* (2013.01); *B60Y 2200/92* (2013.01); *B60Y 2400/61* (2013.01); *F16H 2057/02034* (2013.01); *F16H 2057/02052* (2013.01); *F16H 2702/04* (2013.01)

(58) Field of Classification Search
CPC . B60K 1/02; B60K 17/08; B60K 6/26; B60K 6/365; B60K 6/547; B60K 6/28; B60K 17/165; B60L 50/60; B60L 2210/40; B60Y 2200/91; B60Y 2200/92; B60Y 2400/61

See application file for complete search history.

(56) References Cited

U.S. PATENT DOCUMENTS

| | | | |
|---|---|---|---|
| 2009/0118901 A1 | 5/2009 | Cawthorne et al. | |
| 2016/0347320 A1 | 12/2016 | Zhu et al. | |
| 2018/0339695 A1 * | 11/2018 | Kawahara | B60W 10/08 |
| 2019/0252994 A1 | 8/2019 | Kobayashi | |

FOREIGN PATENT DOCUMENTS

| | | | | |
|---|---|---|---|---|
| DE | 102016218717 B3 * | 2/2018 | ............... | B60K 1/02 |
| JP | 6353576 B1 * | 7/2018 | ............. | B60K 17/08 |
| WO | 2011128538 A1 | 10/2011 | | |
| WO | WO-2018130102 A1 * | 7/2018 | ............. | B60K 17/08 |

\* cited by examiner

REDUNDANT, FAULT TOLERANT TRACTION DRIVE AXLE FOR VEHICLE

FIELD OF THE DISCLOSURE

This disclosure relates to propulsion systems for a vehicle. More particularly, this disclosure relates to propulsion systems having multiple motors coupled to a differential.

BACKGROUND

Vehicles, such as a bus or truck, may have motors for propulsion of an axle. A vehicle may have two motors respectively coupled to different wheels. For example, a vehicle may have a left motor coupled to a left wheel and a right motor coupled to a right wheel, where the motors are individually controlled to the different wheels, e.g., dedicated control. Typically, the motors are located in the wheel hub and may be coupled with a reduction gear. However, in this configuration, since the motors are dedicated to a specific wheel, when one of the motors fails, mechanical power to the wheel is lost.

Additionally, the motors may be switched to different gears. During switching, mechanical power to the wheel is also lost during switching.

SUMMARY

Accordingly, disclosed is a propulsion system for a vehicle. The system comprises an energy storage system configured to supply power to a DC link, a first motor inverter, a second motor inverter, a first motor, a second motor, a gear box and a differential. The first motor inverter is coupled to the energy storage system via the DC link and coupled to the first motor. The first motor inverter is configured to receive power from the DC link and provide AC power to the first motor. The second motor inverter is coupled to the energy storage system via the DC link and coupled to the second motor. The second motor inverter is configured to receive power from the DC link and supplied AC power to the second motor. The gear box is mechanically coupled to the first motor and the second motor. The gear box comprises a first shaft coupled to the first motor and a second shaft coupled to the second motor. The first shaft and the second shaft are concentric with a third shaft. The first shaft extends through a first pinion. The second shaft extends through a second pinion. The third shaft extends through a third pinion. The second pinion has substantially the same tooth count as the first pinion. The third shaft is independent from the first shaft and the second shaft. The gearbox further has a first shifter for the first motor and a second shifter for the second motor.

In an aspect of the disclosure, the first shifter is configured to selectively engage the first pinion to the first shaft, the third pinion to the first shaft or neither the first pinion nor the third pinion to the first shaft when in a neutral position. When engaged, either the first pinion or the third pinion rotated in synchronization with the first motor.

In an aspect of the disclosure, the second shifter is configured to selectively engage the second pinion to the second shaft, the third pinion to the second shaft or neither the second pinion nor the third pinion to the second shaft when a neutral position. When engaged, either the second pinion or the third pinion rotated in synchronization with the second motor.

In an aspect of the disclosure, the gear box further comprises a fourth shaft extending through a first gear and a second gear and an other pinion. The first gear meshes with the first pinion. The second gear meshes with the second pinion. The other pinion meshes with the third pinion and a fourth gear. The second gear has substantially the same tooth count as the first gear.

The differential is mechanically coupled to the fourth gear and a left axle shaft and a right axle shaft.

In an aspect of the disclosure, the first shifter and the second shifter may be asynchronously controlled to such that one of the first shifter and the second shifter is engaged with a pinion when the other of the first shifter and the second shifter is in the neutral position. This control occurs both during acceleration and deceleration. During deceleration the control is such that one motor of the first motor and the second motor is coupled to the fourth gear and maintains a capability of electric regenerative braking during shifting.

In an aspect of the disclosure, the motor inverters may communicate with each other. When one of the first shifter and the second shifter is controlled to switch an engagement of a pinion for an associated motor, a corresponding motor inverter to the switch informs an other motor inverter of the first motor inverter and the second motor inverter of the switch.

In another aspect of the disclosure, in response to receipt of the information of switching, the other motor inverter of the first motor inverter and the second motor inverter may control a corresponding motor of the first motor and the second motor to increase its output from prior to the switch.

In another aspect of the disclosure, when one of the first shifter and the second shifter is switched and the one of the first shifter and the second shifter is in the neutral position, e.g., the motor is in neutral. At this time, the corresponding motor inverter receives a motor speed of the motor not being switched from the other motor inverter. In response to receipt of the motor speed, the corresponding motor inverter controls the motor associated with the one of the first shifter and the second shifter being switched to match a speed of a gear being switched to based on a preset ratio determined from a tooth count and a speed of the motor not being switched.

In another aspect of the disclosure, each of the first motor inverter and the second motor inverter comprises at least a voltage sensor and a current sensor coupled to a respective motor and a processor and wherein the processor is configured to detect a failure based on a signal from the at least a voltage sensor and a current sensor. When a failure is detected in one or more of the first motor and the second motor, a corresponding shifter of the first shifter and the second shifter may be controlled to move to a neutral position for the motor that was detected as a failure.

In another aspect of the disclosure, when a failure is detected in one or more of the first motor inverter and the second motor inverter, a corresponding shifter of the first shifter and the second shifter is controlled to connect the one or more of the first motor and the second motor which corresponds to the detected failed inverter to the neutral.

In another aspect of the disclosure, the first motor and the second motor may be positioned a distance from the axle, the distance being greater than a radius of the axle plus a radius of respective motor of the first motor and the second motor plus a preset value.

In another aspect of the disclosure, the vehicle may be an electric or a hybrid electric vehicle.

In another aspect of the disclosure, a hybrid or electric vehicle is disclosed. The vehicle comprises an energy storage system, motors, motor inverters, a gear box and a differential. The energy storage system is configured to supply power to a DC link. The motors include at least two motors, such as a first motor and a second motor. The motor inverters include at least two inverters, such as a first inverter and a second inverter. The first inverter is coupled to the energy storage system via the DC link and the first motor. The first motor inverter is configured to receive power from the DC link and provide AC power to the first motor. The second inverter is coupled to the energy storage system via the DC link and the second motor. The second motor inverter is configured to receive power from the DC link and supply AC power to the second motor.

The gear box is mechanically coupled to the motors. The gear box comprises a first shaft coupled to the first motor and a second shaft coupled to the second motor. The first shaft and the second shaft are concentric with a third shaft. The first shaft extends through a first pinion. The second shaft extends through a second pinion. The third shaft extends through a third pinion. The second pinion has substantially the same tooth count as the first pinion. The third shaft is independent from the first shaft and the second shaft. The gearbox further has a first shifter for the first motor and a second shifter for the second motor.

In an aspect of the disclosure, the first shifter is configured to selectively engage the first pinion to the first shaft, the third pinion to the first shaft or neither the first pinion nor the third pinion to the first shaft when in a neutral position. When engaged, either the first pinion or the third pinion rotated in synchronization with the first motor.

In an aspect of the disclosure, the second shifter is configured to selectively engage the second pinion to the second shaft, the third pinion to the second shaft or neither the second pinion nor the third pinion to the second shaft when a neutral position. When engaged, either the second pinion or the third pinion rotated in synchronization with the second motor.

In an aspect of the disclosure, the gear box further comprises a fourth shaft extending through a first gear and a second gear and an other pinion. The first gear meshes with the first pinion. The second gear meshes with the second pinion. The other pinion meshes with the third pinion and a fourth gear. The second gear has substantially the same tooth count as the first gear.

The differential is mechanically coupled to the fourth gear and a left axle shaft and a right axle shaft.

DETAILED DESCRIPTION

The systems described herein may be used in a moving vehicle with an axle. The vehicle may be a hybrid vehicle or an electric vehicle. In a case where a vehicle has multiple axles, the systems described herein may be used for each axle (one per axle). The moving vehicle may be a bus, a truck, a car and the like having an axle.

Figure 1:
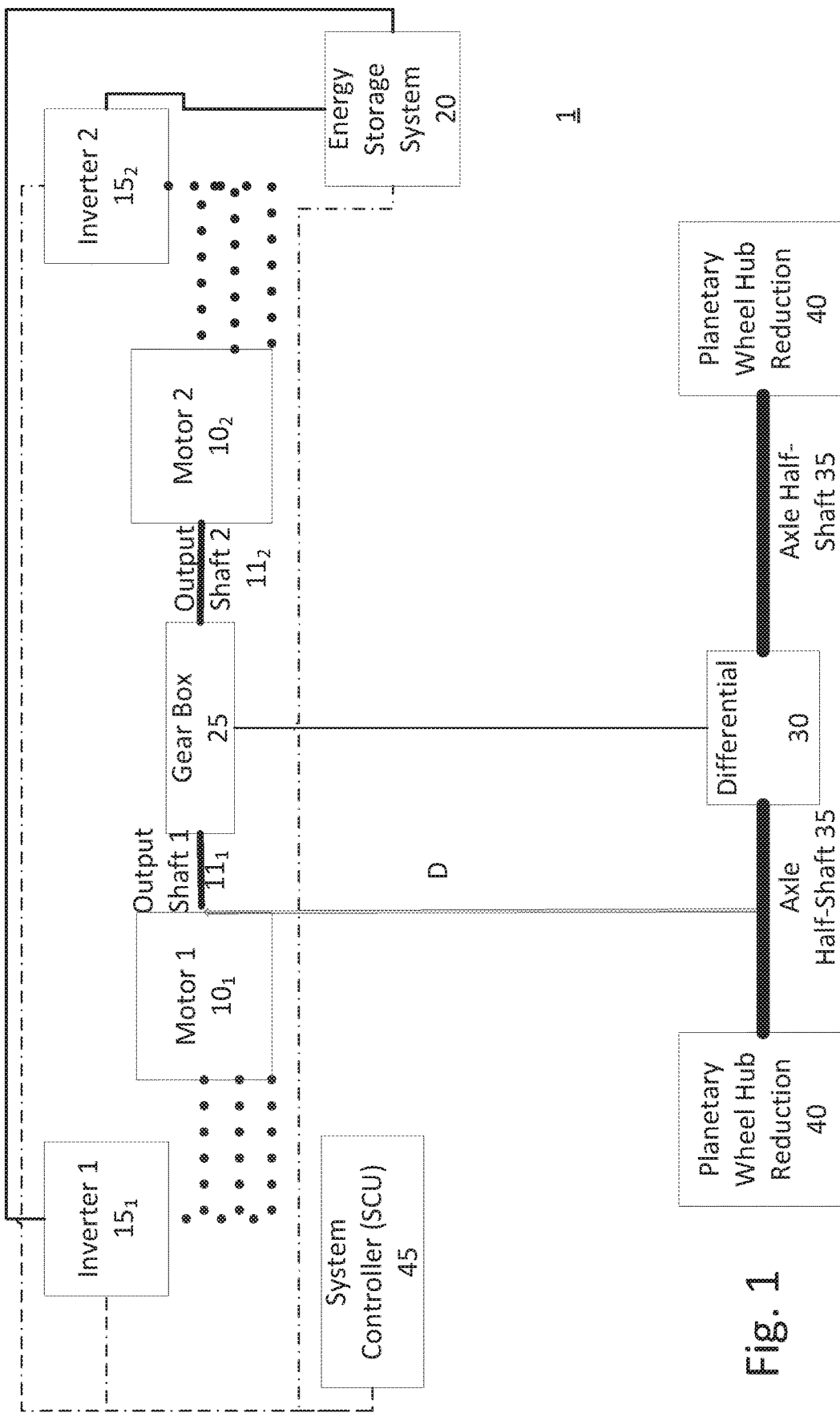
FIG. 1 illustrates a diagram of a system in accordance with aspects of the disclosure.

FIG. 1 depicts a diagram of an example of a system 1 used in an electric vehicle. The system 1 comprises two motors, motor 1 $10_1$ and motor 2 $10_2$ (collectively motors 10). The motors 10 may be off the shelf motors. The motors 10 may be switching motors. This is a specific example of a motor and other motors may be used in accordance with aspects of the disclosure. The specific motor used may be based on the type of vehicle and performance requirements.

The motors 10 are connected to the same gear box 25. Specifically, the output shaft (collectively output shaft 11 and individually output shaft 1 $11_1$ and output shaft 2 $11_2$) of the motors are connected with the gear box 25. Since the motors are connected to the same gear box, the motors are cross-coupled. The motors 10 may share the load, e.g., axle 35 via differential 30, therefore, in a case of a failure, the motors 10 provide redundancy.

Figure 2:
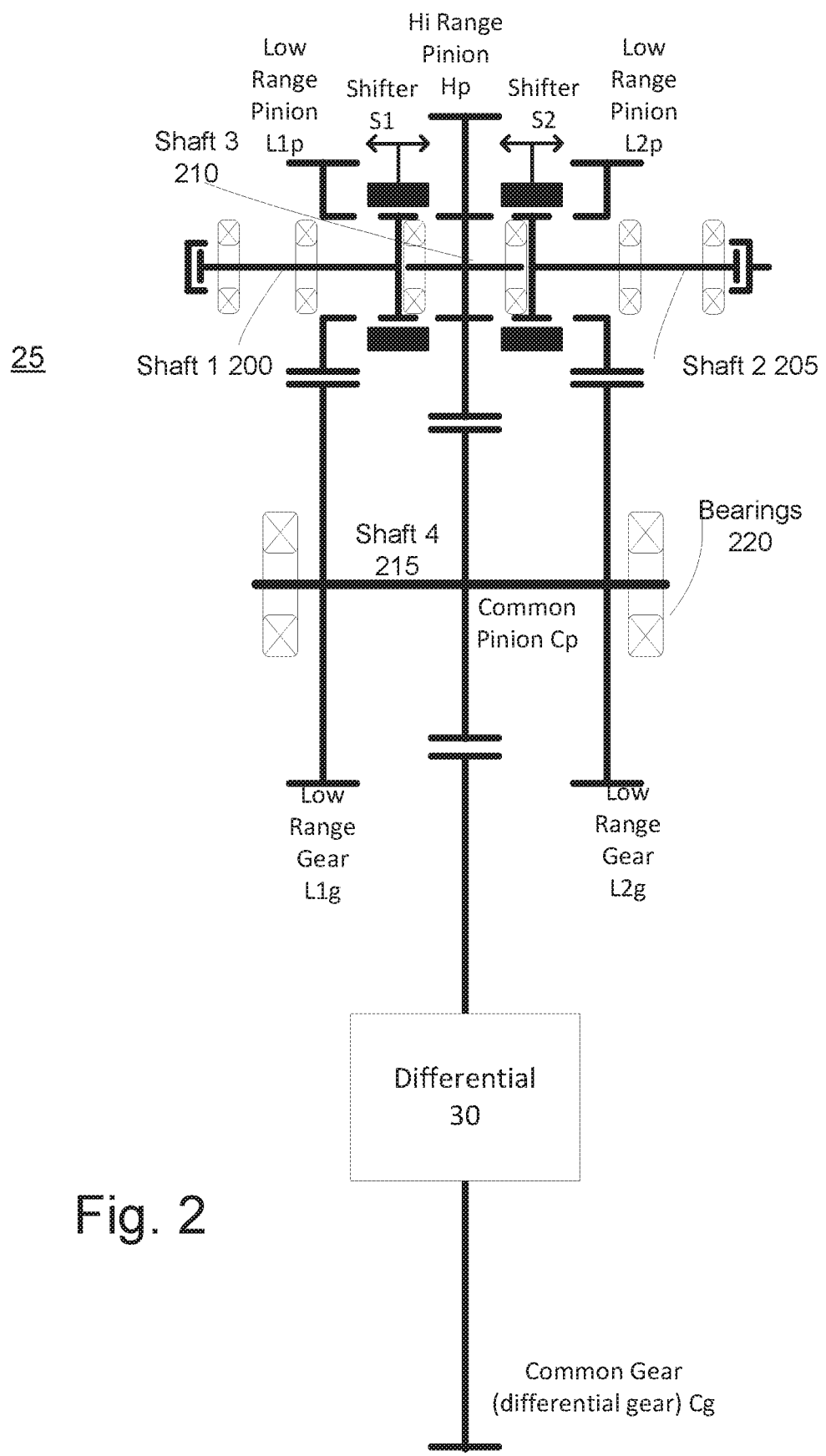
FIG. 2 illustrates a diagram of a gear box in accordance with aspects of the disclosure.

FIG. 2 depicts an example of a gear box 25 in accordance with aspects of the disclosure. The gear box 25 comprises a plurality of gears including pinion gears. In the example, the gear box 25 has a common high range pinion gear Hp, which was common to both motors. The gear box also has respective individual gear systems which are specific to each motor $10_1$ and $10_2$. The respective individual gear systems are the same for both motors $10_1$ and $10_2$. The respective individual gear systems comprise a low range pinion (collectively pinion LP and individually pinion L1p and pinion L2p) and a low range gear (collectively gear Lg and individually gear L1g and gear L2g.) The tooth count for pinion L1p and pinion L2p are the same. Similarly, the tooth count for gear L1g and gear L2g are the same. Pinion L1p and low range gear L1g are used for the motor 1 $10_1$ and pinion L2p and low range gear L2g are used for the motor 2 $10_2$.

The gear box 25 also comprises a common pinion gear Cp. In some aspects of the disclosure, the gear box 25 may also comprise a common gear (Cg) (also referred to as a differential gear). In other aspects of the disclosure, the differential gear is external to the gear box 25.

The gear box 25 further comprises a plurality of shafts. For example, the gear box 25 comprises Shafts 1-4 200, 205, 210, 215. Shafts 1-3 200, 205, 210 are concentric. Shaft 1 is connected to output shaft $11_1$ of the first motor $10_1$. Shaft 2 is connected to output shaft $11_2$ of the second motor $10_2$. Shaft 3 210 extends between Shaft 1 200 and Shaft 2 205. Shaft 3 210 extends through the high range pinion Hp. Shaft 1 extends through the low range pinion L1p and Shaft 2 extends through the low range pinion L2p. Each Shaft 1-4 is supported on ends by bearings 220.

Shaft 4 215 extends through the low range gears L1g and L2g and the common pinion Cp. When Shaft 4 rotates (being driven by one of the pinions), the low range gears Lg (L1g (when connected to the shifter S) and common pinion Cp rotate.

Figure 9:
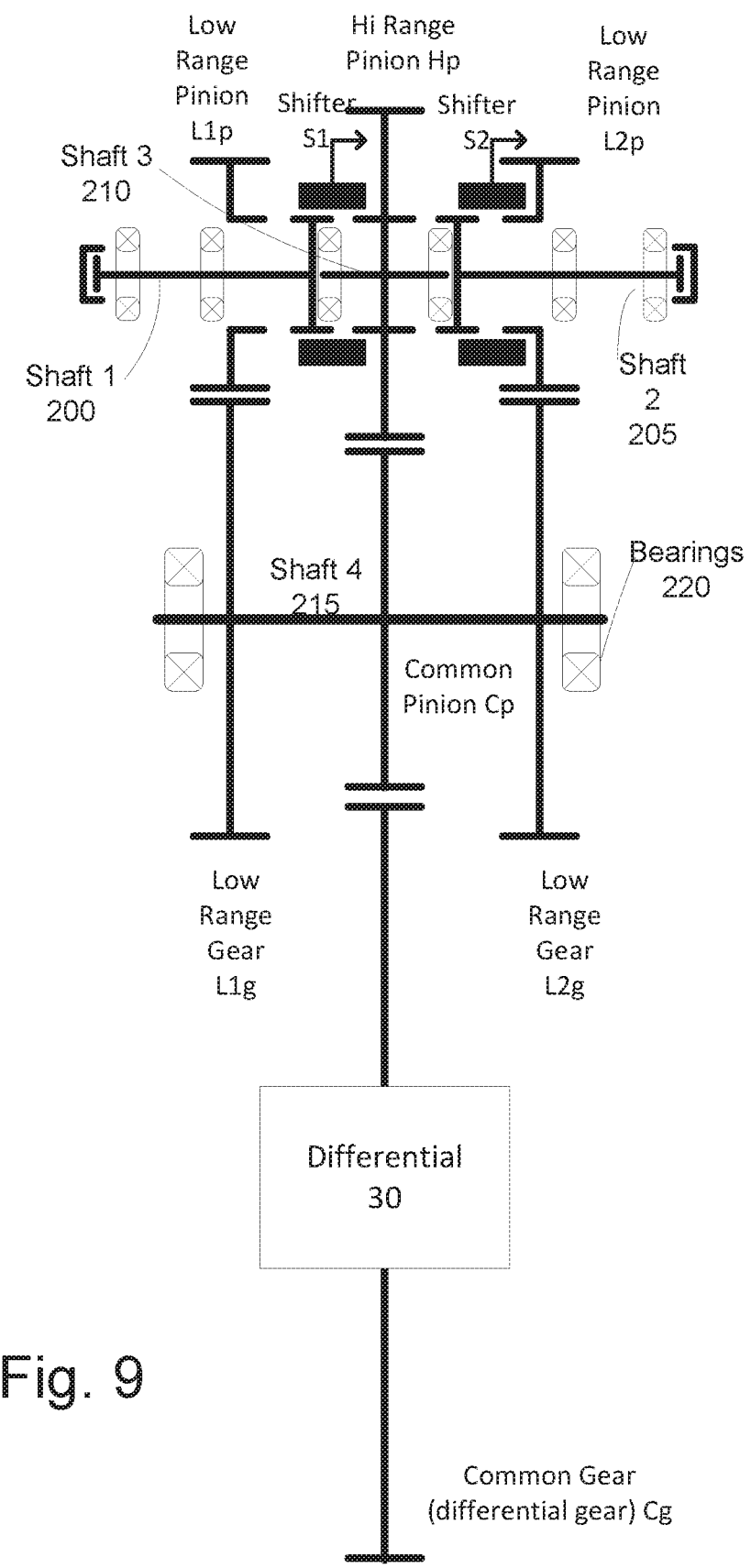
FIG. 9 illustrates an example of a shifter position when one is in hi gear and the other is in low gear.
Figure 10:
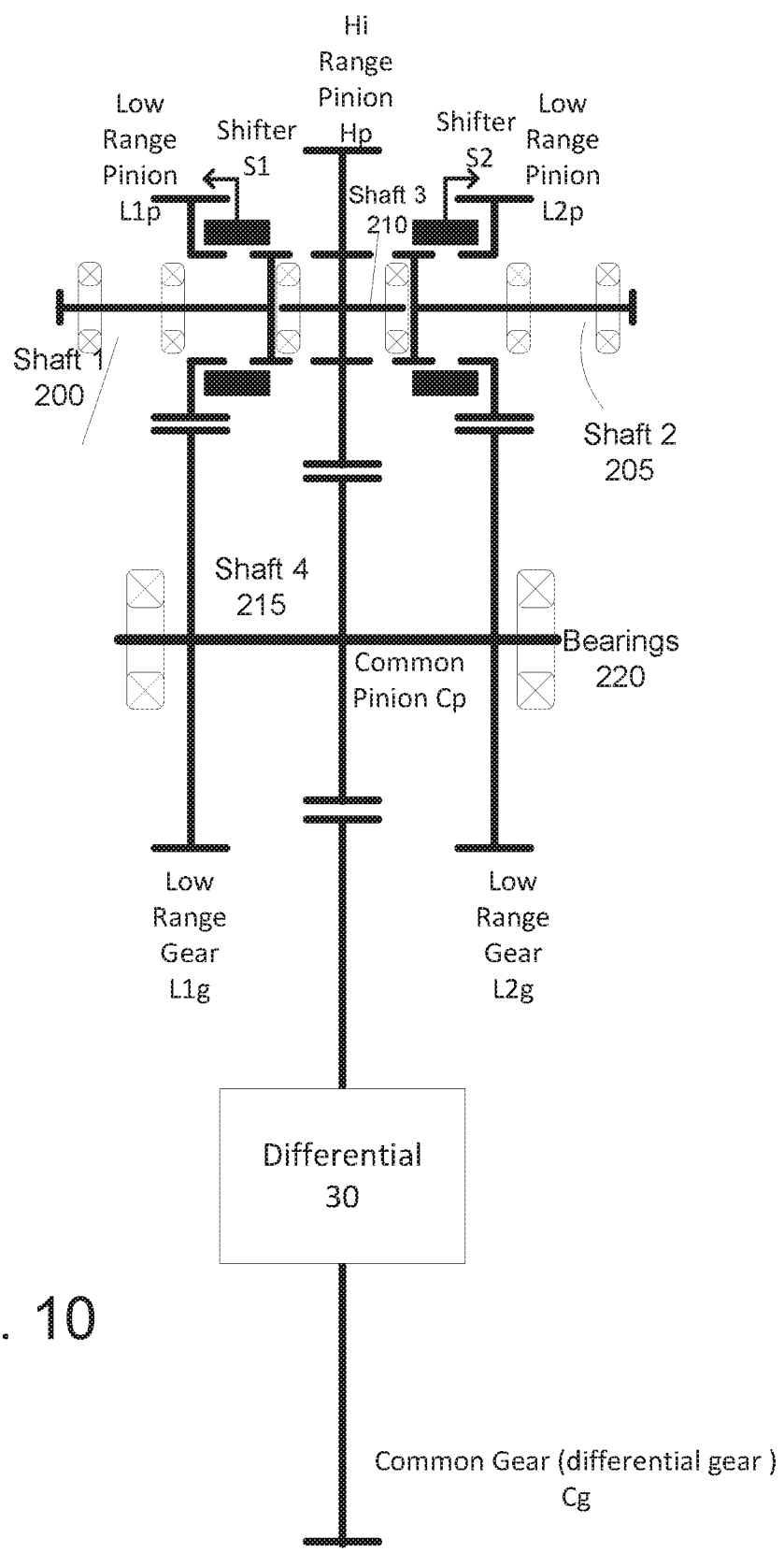
FIG. 10 illustrates an example of a shifter position when both are in low gear.

The gear box 25 also comprises shifters (collective shifter S, individually Shifter S1 and Shifter S2). Shifter S1 is used for motor 1 $10_1$ and shifter S2 is used for motor 2 $10_2$. The shifters S are configured to shift gear systems between the common gear system, e.g., high gear, a neutral and the respective individual gear systems. The shifters S mesh or contact the collar of the respective gears and couple the same to a respective shaft. FIG. 9 illustrates an example where shifter S1 is located around the hi range pinion Hp (high gear) (around the collar) and shifter S2 is located around the low range pinion L2p (low gear) (around the collar). FIG. 10 illustrates an example where shifter S1 is located around the low range pinion L1p (low gear) (around the collar) and shifter S2 is located around the low range pinion L2p (low gear) (around the collar).

When in neutral, the Shaft 4 215 rotates, without being connected to any of the gears, e.g., free spin. However, when in either high or low gear, when the Shaft 4 215 rotates (being driven by the motor(s) 10) and one or more of the gears rotated in conjunction.

In an aspect of the disclosure, the shifters S may comprise a rod, yoke, and dogs, in another aspect may comprise hydraulic or pneumatic clutches.

The system 1 also comprises a differential 30. The common gear Cg is connected to the differential 30 to drive the same, and thus, the gear box 25 is connected to the differential 30.

The gear ratios are based on tooth count in the respective gears. For example, the high range gear ratio is determined based on the following equation:

$$\text{Hi range gear ratio} = Cg/Hp \qquad (1).$$

The low range gear ratio is determined based on the following equation:

$$\text{Low range gear ratio} = (Lg/Lp)*(Cg/Cp) \qquad (2).$$

Both motors 10 have the same low range gear ratio.

The tooth count and type of gear system may be based on the type of vehicle, size, weight and/or performance requirements and/or type of propulsion motor(s). For example, the tooth count and gear system may be different for a bus than a car. Additionally, the tooth count and type of gear system may be different for a 40 foot bus than a 60 foot bus. Additionally, the tooth count and type of gears may be different for motors of different operating speed and/or torque ranges.

For example, the tooth count for the low range pinion Lp for a 40 foot bus may be 24, whereas the tooth count for the low range pinion Lp for a 60 foot bus may be 26. Similarly, the tooth count for the low range gear Lg may be 64 for the 40 foot bus and 66 for the 60 foot bus. Thus, the low range gear ratio for the 40 foot bus may be 6.72 whereas, the low range gear ratio for the 60 foot bus may be 7.57 to account for vehicle weight differences.

In an aspect of the disclosure, the tooth count for the high range may be the same for both the 40 and 60 foot bus. For example, the high range pinion Hp may have a tooth count of 21; the common pinion Cp may have a tooth count of 23; and the common gear Cg may have a tooth count of 58. Thus, the Hi range gear ratio may be 2.76 as both vehicles have the same top speed requirements.

In an aspect of the disclosure, a 2.5 module gear system may be used for the low range. In other aspects of the disclosure, a 3.0 module gear system may be used for the low range. In an aspect of the disclosure, a 6.0 module gear system may be used for the high range. The type of gear described above is an example for descriptive purposes only and other systems and tooth counts may be used.

Additionally, the gear box 25 depicted in FIG. 2 has two levels of gears (low gear and high gear), in other aspects of the disclosure, the gear box 25 may be more than two levels, such as low, mid and high or 1st-5th gears.

As described above, the motors 10 are connected to the same gear box 25 and thus motor 1 $10_1$ and motor 2 $10_2$ are also both connected to the differential 30.

The differential 30 may be a standard, off the shelf differential, the structure of which is known and will not be described in detail.

The axle half-shaft(s) 35 (also referred to herein as axle(s) 35) are connected to the differential 30. For example, the axles 35 are connected to respective gears in the differential 30.

Planetary wheel reductions 40 are located on the respective ends of the axle shaft(s) 35. The planetary wheel reductions are connected with the wheels of the vehicle, respectively. The planetary wheel reduction 40 reduces rotary speed of the axle half-shafts 35 to a lower rotary speed more appropriate to the vehicle and tire size and desired vehicle road speed. For example, the axle half-shaft 35 for a 40 foot bus may rotate at 2280 RPM. However, the wheels may only rotate at 570 RPM at a specific speed of the vehicle, e.g., 65 mph. Therefore, for a 40 foot bus, the reduction ratio may be 4 to 1. In another example, the axle half-shaft 35 for a 60 foot bus may rotate at 3680 rpm. Therefore, for a 60 foot bus, the reduction ratio may be 4.706 to 1.

In an aspect of the disclosure, the motors 10 are located a predetermined distance D from the axle 35. The distance both minimize overhung moment on the axle-housing while still allowing for easy access to the motors 10 for maintenance and repair which is an advantage over certain known systems were the motor is much less accessible located in the wheel hub assembly. In an aspect of the disclosure, the predetermined distance D is the radius of the motor plus the radius of the axle shaft tube plus a preset offset distance which may be determined by an appropriate service clearance between the two. For example, the predetermined distance D may be 375 mm. In another aspect of the disclosure, the predetermined distance D may be 315 mm.

In another aspect of the disclosure, the predetermined distance D may be based on the size of the gear system or gear box. In this aspect, the predetermined distance D may be a sum of the distance between the output shaft 11 of the motor to Shaft 4 215 and the distance from the Shaft 4 215 to the axle 35. For example, the distance between the output shaft 11 and Shaft 4 215 may be 132 mm and the distance between Shaft 4 215 and the axle 35 may be 243 mm. The specific examples of distances are provided only for descriptive purposes and other distance may be used.

The system 1 also comprises an energy storage system (ESS) 20 and inverters (collectively 15 and individually inverter 1 $15_1$ and inverter 2 $15_2$). Inverter 1 $15_1$ is for the motor 1 $10_1$ and inverter 2 $15_2$ is for motor 2 $10_2$. The ESS 20 provides direct current (DC) electric power to a high voltage DC link which is coupled to the inverters 15. The DC link is shown in the figures as lines (the three-phase AC power is shown by dots). The ESS 20 in one example includes lithium ion batteries. In an aspect of the disclosure, the nominal voltage of the ESS 20 is 500V-750V. In other aspects of the disclosure, the DC-Link voltage may be 250V-450V.

The ESS 20 may also alternatively include ultra-capacitors, lead-acid batteries, and other energy storage mediums. The ultra-capacitor may include an electric double-layer capacitor (EDLC), also known as a, supercapacitor, supercondenser, or an electrochemical double layer capacitor, which has an electrochemical capacitor with relatively high energy density.

The inverters 15 receive DC power from the ESS 20 via the DC link and provide a three-phase AC power to the motors 10, respectively. The three phase AC power is shown in the figures as dots connecting the inverter and motor.

The term inverter used herein not only means circuitry for transforming DC into AC or vice versa, but also include control circuitry and programs for functions, including but not limited to, frequency determination and duty cycle calculations and determining whether a malfunction is occurring in a motor(s) 10.

Figure 4:
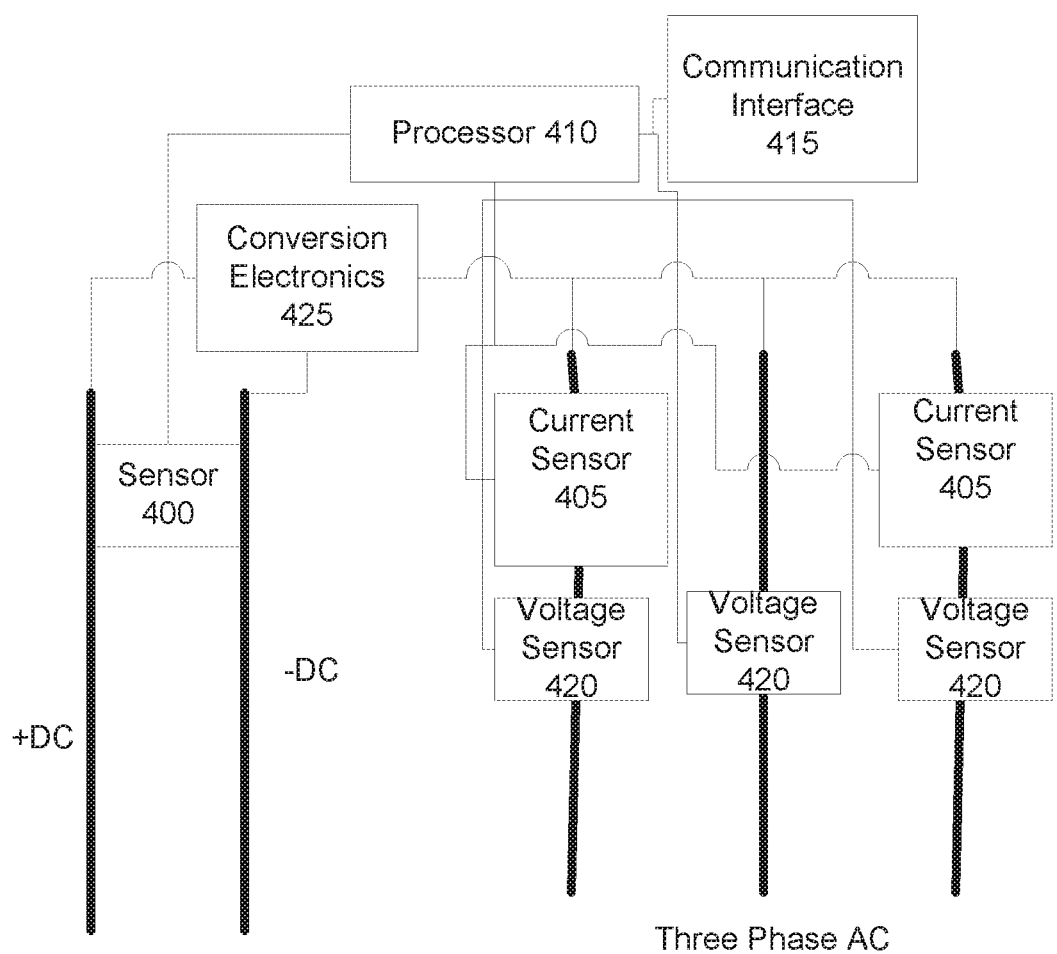
FIG. 4 illustrates a diagram of an inverter in accordance with aspects of the disclosure.

In an aspect of the disclosure, the inverters 15 may also control the shifters S to shift between gears. The inverter 15 also includes sensors. For example, as shown in FIG. 4, inverter 15 comprises a voltage sensor 400 on the DC Link and voltage sensors 420 on each phase of the three phase AC voltage current sensors 405 (two current sensors, respectively on two of the three phases). In an aspect of the disclosure, a voltage sensor detects a voltage of the ESS 20. Similarly, the current sensors 405 detect the current of two of the three-phases output from the inverter 15.

The inverters 15 also comprise a processor 410. The processor 410 may control the switching of the gears and determine whether a malfunction is occurring in the motor (or has occurred) based on information from the voltage sensors 400, the current sensors 405 and voltage sensors 420. Additionally, the processor 410 (of one inverter) may communicate with the other inverter via a communication interface 415 (the processor of the other inverter). In an aspect of the disclosure, the inverters 15 may communicate with each other over a control area network (CAN), as shown in the figures as thin communication lines, e.g., 1M bit/sec CAN. The inverter also includes the conversion electronics 425.

The system 1 further comprises a system control unit (SCU) 45. The SCU 45 communicates with various components of the vehicle over the CAN, shown in the figures as thin communication lines. For example, the SCU 45 communicates with inverter 1 $15_1$ and inverter 2 $15_2$, and the ESS 20.

The SCU 45 comprises a processor 700, a memory 705 and a communication interface 710 (for CAN). Certain functionality of the processor will be described in detail later.

The processor (both 410 and 700) may be a microcontroller or microprocessor or any other processing hardware such as a CPU or GPU. The memory may be separate from the processor (as or integrated in the same). For example, the microcontroller or microprocessor includes at least one data storage device, such as, but not limited to, RAM, ROM and persistent storage. In an aspect of the disclosure, the processor may be configured to execute one or more programs stored in a computer readable storage device. The computer readable storage device can be RAM, persistent storage or removable storage. A storage device is any piece of hardware that is capable of storing information, such as, for example without limitation, data, programs, instructions, program code, and/or other suitable information, either on a temporary basis and/or a permanent basis.

The SCU 45 in conjunction with the inverters 15 control the amount of power supplied to the motors, when to switch gears and the switching of the gears.

In an aspect of the disclosure, the processor 700 in the SCU 45 determines when to switch the gears, e.g., the appropriate switching point. In an aspect of the disclosure, the determination may be based on speed of the motor. In other aspects of the disclosure, the determination may be based on a torque of the motor. Alternatively, in other aspects of the disclosure, both the speed and the torque of the motor may be used.

Since speed and/or torque may be used to determine when to switch, switching may also be determined based on the type of motor used. For example, different motors have different power/speed/torque curves.

Additionally, the type of vehicle may also be used to determine when to switch gears. For example, the optimal switching point is different for a 40 foot bus verses a 60 foot bus.

In an aspect of the disclosure, the switching point(s) may be stored in memory 705. For example, a switching point for going from low to high gear may be stored in advance. Similarly, a switching point for going from high to low gear may be stored in advance. The two switching points, e.g., low to high gear and high to low gear may be different. In other aspects of the disclosure, the two switching points are the same. For example, for a 40 foot bus, the optimal shift point may be 7000 rpm (at approximately 30 mph). The optical shift point for a 60 foot bus may be 7500 rpm (at approximately 24 mph).

In an aspect of the disclosure, the determination of when to switch gears is also based on the requested propulsion by the operator of the vehicle. The requested propulsion may be a speed command or a torque command or a power command. The SCU 45 using its control laws determines the required output for the motors based on the inputted propulsion request and the current operating conditions.

For example, when a higher torque is needed, the low gear may be used. Additionally, when a higher speed is needed (with a low torque), the high gear may be used.

During normal driving (with no malfunction) and no switching, both shifters are either connected with the hi range pinion Hp (high gear) or the respective individual gears L1p and L2p (low gear). Both motors 10 share the load. In an aspect of the disclosure, the SCU 45 causes the motors 10 to balance the load, e.g., share the load 50/50. In other aspects of the disclosure, equal load balancing is not required.

In accordance with aspects of the disclosure, the motors 10 switch gears asynchronously, such that one motor remains connected to the differential 30 and axle half-shafts 35 when the other is switching gears (shifters not in neutral position at the same time).

Figure 3:
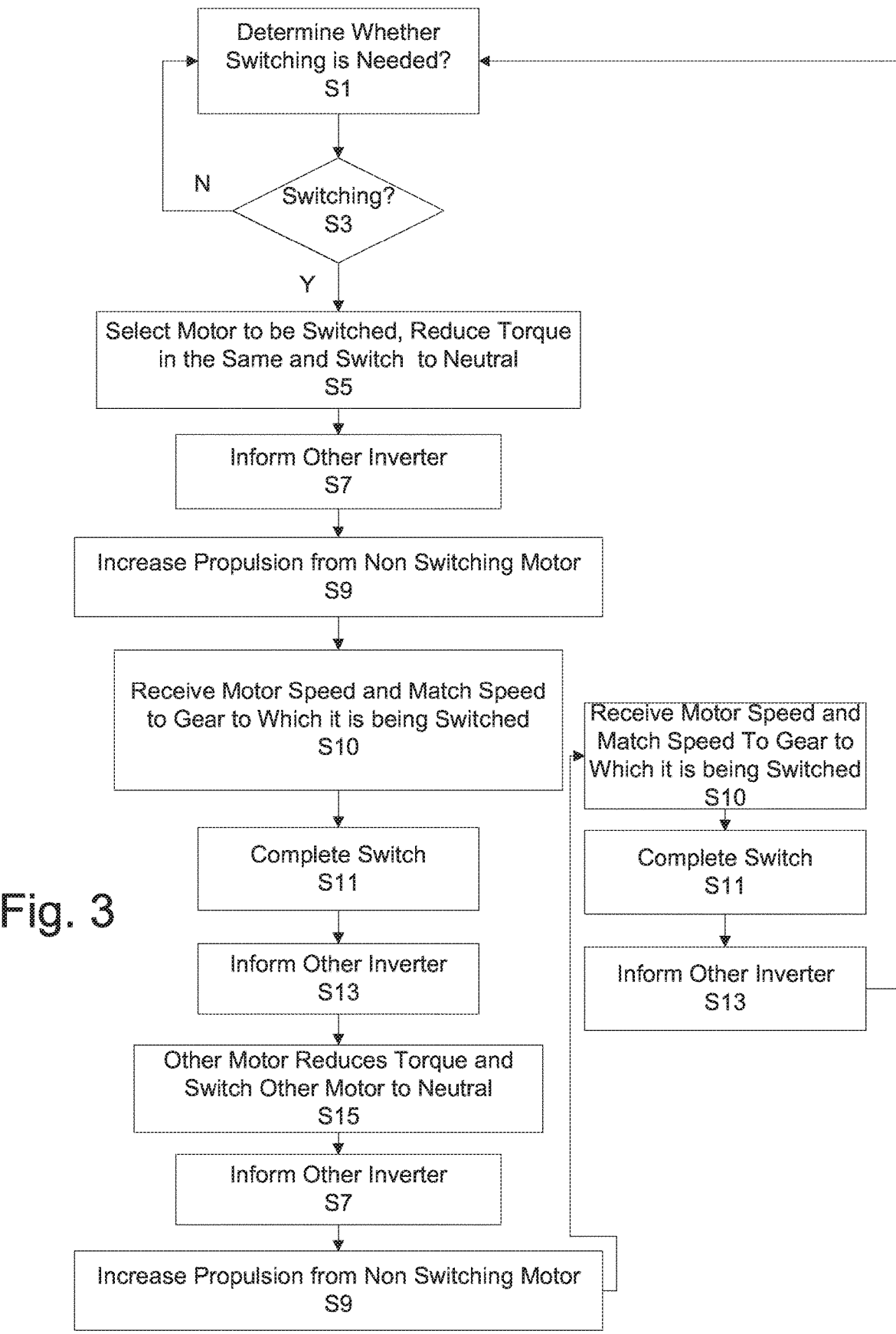
FIG. 3 illustrates a flowchart for switching gears for a set of motors in accordance with aspects of the disclosure.

FIG. 3 illustrates a flow chart of switching gears in accordance with aspects of the disclosure. The switching described herein may occur during acceleration and deceleration.

At S1, the processor 700 determines whether switching is needed. In accordance with aspects of the disclosure, the processor 700 receives a current operating speed from the inverters 15 (processor 410). The current operating speed may be determined without sensors or by using a speed sensor (not shown). The speed sensor may be a resolver. In an aspect of the disclosure, the processor 700 also receives from the inverters 15 the current position of the shifters S, e.g., which pinion, respectively, for each motor. The processor 700 also receives a propulsion request from the operator and determines the required propulsion, e.g. torque and speed of the motors. The processor 700 may compare the determined speed needed from the motors with the current operating speed. If the determined speed needed for the motors is higher than the current operating speed, the processor 700 retrieves the switching point for low to high gear from memory 705 when the current position of the shifters S is connected to the respective low range pinions L2p (low gear). Subsequently, the processor 700 compares the determined speed needed from the motors with the switching point for low to high gear, e.g., 7000 rpm for 40 foot bus or 7500 rpm for 60 foot bus. If the determined speed needed is higher than the switching point, the processor 700 determines that switching is needed ("Y" at S3) (switching from low to high gear). On the other hand, if the determined speed needed is lower than or equal to the switching point, the processor 700 determines that switching is not needed ("N" at S3)

When the current position of the shifters S is the hi range pinion Hp and the determined speed needed is higher than the current speed, since the shifters S are already connected to the high gear, no switching is needed ("N" at S3).

If the determined speed needed for the motors is lower than the current operating speed, the processor 700 retrieves the switching point for high to low gear from memory 705 when the current position of the shifters S is connected to the hi range pinion Hp (high gear).

Subsequently, the processor 700 compares the determined speed needed from the motors with the switching point for high to low gear. If the determined speed needed is lower than the switching point, the processor 700 determines that switching is needed ("Y" at S3) (switching from high to low gear). On the other hand, if the determined speed needed is higher than the switching point, the processor 700 determines that switching is not needed ("N" at S3)

When the current position of the shifters S is the respective individual gears L1p and L2p (low gear) and the determined speed needed is lower than the current speed, since the shifters S are already connected to the low gear, no switching is needed ("N" at S3).

While the above switching determination was described with respect to the speed of the motor and the switching point(s) are speed(s), the determination may be based on required torque and the switching point(s) may be a preset torque.

When the processor 700 determines that switching of the gears is needed ("Y" at S3), the processor 700 issues an instruction to the processors 410 in the inverters 15 to begin the switching process (either low to high gear or high to low gear).

At S5, one of the motors is selected to switch first, since both motors 10 are not switched at the same time. In an aspect of the disclosure, either motor 1 10$_1$ or motor 2 10$_2$ is set as a default to switch first. For purposes of the description, motor 1 10$_1$ is set as the default to switch first.

Prior to the switch, the requested torque is reduced also at S5. This is to avoid the motor 10 overspeeding if the torque were still present. Once the torque is reduced, the processor 410 (in inverter 1 15$_1$) causes the shifter S1 to shift to a neutral position (not connected to either low range pinion L1p or high range pinion Hp). For example, the processor 410 may use a mechanical actuator (not shown) to move the shifter S1.

At S7, the processor 410 (in inverter 1 15$_1$) transmits an indication to the processor 410 (in inverter 2 15$_2$) that the switch has begun. The transmission is via CAN and using the respective communication interfaces 415.

Upon receipt of the indication, the processor 410 (in inverter 2 15$_2$) boosts the output of motor 2 10$_2$ at S9. The amount of the boost is to cover the transient change (e.g., amount lost when motor 1 is switched). As described above, when both motors 10 are connected to a gear (driving the gears), the motors share the load, e.g., 50/50. However, when a shifter is moved to switch gears, the entire load is supported by the other motor; up to the lesser of the total power demand or the maximum transient power capacity of the motor. In this case, shifter S1 is switched to neutral and thus the corresponding motor is not driving the gears. Therefore, motor 2 10$_2$, which is still driving the gears, maintains the output to be the same as if both motors 10 were driving. This boost is only temporary and to the extent that the motor 2 10$_2$ is capable of meeting the demand without exceeding its limit. Therefore, the amount of the temporary boost is based on the power being delivered prior to the switch. In an aspect of the disclosure, the temporary boost may be double the pre-switch output. The temporary boost allows the operator of the vehicle not to feel the change as the performance of the vehicle remains the same, e.g., no power or torque interruption. In an aspect of the disclosure, the boost amount may also be based on the current propulsion demand from the operator (if changed).

Once the power is boosted, the processor 410 (in inverter 2 15$_2$) reports to the processor 410 (in inverter 1 15$_1$) the speed of motor 2 10$_2$. The current operating speed of motor 2 10$_2$ may be determined in a similar manner as described above. The processor 410 (in inverter 2 15$_2$) transmits the speed via CAN using the communication interface 415.

At S10, the processor 410 (in inverter 1 15$_1$) receives the speed of motor 2 10$_2$, and causes the speed of gear which is being switch to, to match the speed of the other motor. The gear ratios, e.g., High/Low or Low/High and low range gear ratio and high range gear ratios are known. In an aspect of the disclosure, these ratios are stored in memory in the inverters 15. Thus, when the processor 410 (in inverter 1 15$_1$) receives the speed of motor 2 10$_2$, the processor 410 retrieves the appropriate ratio (depending on the current gear connections) and determines the needed speed for the gear which is being switch to and thus, the motor 1 10$_1$ speed needed to match.

Example, if motor 1 10$_1$ is being switched (shifter S1 is moved) from lo-to-hi and motor 2 10$_2$ remains driving the gears, when motor 2 10$_2$ is reporting 7000 rpm, the hi-range pinion (Hp) speed will be: 7000*(L2p/L2g)*(Cp/Hp), and motor 1 10$_1$ will synchronize its speed to match Hp speed based on updated speed data from Motor 2 10$_2$.

After the speed is determined, the inverter 1 15$_1$ supplies the power required to the motor, e.g., motor 1 10$_1$, and the processor 410 (in inverter 1 15$_1$) completes the switch at S11 by actuating the shifter S1 (either connect to Low range pinion L1p or high range pinion Hp).

When the switching is complete, the processor 410 (in inverter 1 15$_1$) notifies the processor 410 (in inverter 2 15$_2$) that the switch is completed at S13. The other motor is then switched to neutral at S15 (after the torque is reduced). S7-S13 are repeated for the other motor, e.g., motor 2 10$_2$. In other aspects of the disclosure, the switching of the second motor may not be performed, depending on a current propulsion request.

Once both of the motors 10 are switched, both are either connected to the low range pinion Lp (L1p or L2p) or the high range pinion Hp and share the load equally again. The temporary boost of the output is reduced to the pre-switching output.

By having the motors 10 switch (shifters S1 and S2) operated independently and at different times, e.g., asynchronously, the time for shifting may be longer than if both motors are shifted at the same time, but switching at the same time means that neither motor 10 is driving the load and thus the load would not be supplied with power during switching. In this situation the operator of the vehicle would notice performance drop, e.g., power reduction and speed reduction. The longer switching time advantageously provides less wear on the shifters S and other mechanical components involved in the switching (such as actuators).

Figure 5:
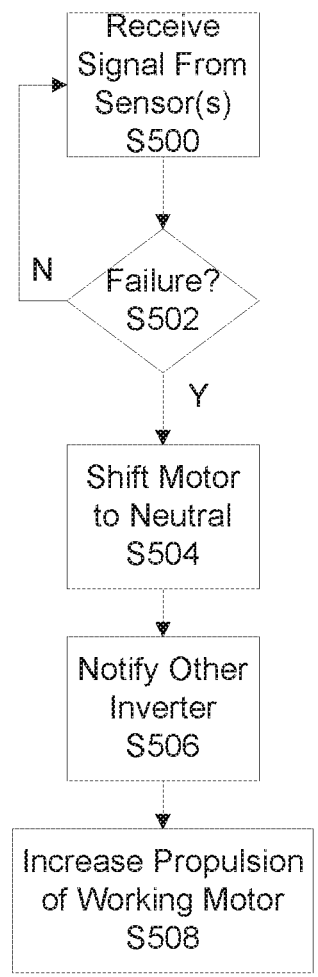
FIG. 5 illustrates a flowchart for responding to a motor malfunction in accordance with aspects of the disclosure.

Additionally, in accordance with aspects of the disclosure, due to the redundant configuration, e.g., cross coupling of the motors 10, even when one of the motors fails, the vehicle may still be driven. FIG. 5 illustrates a flowchart for responding to a motor malfunction in accordance with aspects of the disclosure.

Each inverter 15 respectively monitors the functioning of its corresponding motor. Inverter 1 $15_1$ monitors motor 1 $10_1$ and inverter 2 $15_2$ monitors motor 2 $10_2$. Based on this monitoring, the inverter 15 may detect a malfunction and respond accordingly.

In an aspect of the disclosure, a malfunction may be detected based on current and/or voltage readings measured by sensors 400, 405, 420 or when a DC and/or AC ground fault is detected. The ground fault is detected relative to chassis. For example, at S500, the processor 410 (in each inverter 15) receives signals from the sensors 400, 405, 420. A significant change from expected values may indicate a fault or malfunction. For example, in a case where a short occurs in the motor, current would spike and would be sensed by the current sensors 405. A significant change may be determined by a percentage deviation from the expected values. For example, when a sensed value exceeds the expected value by a preset percentage, the change is deemed "significant". For example, the percentage may be 50% or more. In other aspects, the percentage may be 100% or more. In other aspects, the percentage may be 20% or more.

In other aspects, instead of a percentage, a preset value may be used. By monitoring the current and the voltage, changes in the same may be quickly discovered. If the voltage or current changed more than a preset amount (from a set value), the processor 410 determines a malfunction has occurred in the motor ("Y" at S502). In other aspects, the processor 410 also determines if a DC and/or AC ground fault has occurred and determines that a malfunction has occurred when either a DC or an AC ground fault.

When one of the processors 410 (in an inverter) determines that a malfunction occurs ("Y" at S502) (other than a DC ground fault), the corresponding motor is shifted into neutral at S504, whereby the motor cannot drive the gears. The processor 410 moves the shifter S using an actuator from being connected to a pinion to a position detached from the same. Additionally, the inverter stops supplying power to the motor. For example, if motor 1 $10_1$ was connected to the low range pinion L1p (and motor 1 is detected to be malfunctioning), the processor 410 (in inverter $15_1$) causes the shifter S1 to move to disconnect the low range pinion L1. When a DC ground fault is detected, if the vehicle is a hybrid electric vehicle, the energy storage system 20 (battery) is disconnected, however, the motor remains connected powered by the prime mover, e.g., engine 800.

When the motor, e.g., motor 1 $10_1$, is disconnected and powered down, the processor 410 (e.g., in inverter $15_1$ using the above example) transmits a notification to the processor 410 (in the other inverter, e.g., in the above example, inverter $15_2$) indicating the switch at S506.

In response to receiving the notification, the processor 410 (in inverter $15_2$) causes motor 2 $10_2$ (the working motor) to increase its output (to the extent that it is capable) in order to maintain the output to the load (e.g., axle 35 via the differential 30) at pre-shifted levels. Once again, as noted above, this assumes that the working motor can handle the additional load.

In an aspect of the disclosure, when a motor is shifted to neutral, one of the inverters ($15_1$ and/or $15_2$) may inform the SCU 45. In an aspect of the disclosure, upon receipt of the notification from one of the inverters ($15_1$ and/or $15_2$), the SCU 45 may issue a system level warning to the operator of the vehicle, such as a warning to be displayed on a dashboard of the vehicle (not shown). By providing the warning, the operator of the vehicle may drive the vehicle to an area for maintenance, such as a bus depot or a gas station. Additionally, by providing the warning, the operator of the vehicle may alter the propulsion request to avoid overtaxing the working motor.

In another aspect of the disclosure, upon receipt of the notification, the SCU 45 may alter the propulsion command to the inverter of the working motor (e.g., inverter 2 $15_2$ using the above example). Thus, the vehicle may include a reduced power mode in a case where one of the motors malfunctions.

Similarly, in a case where an inverter malfunctions, a corresponding motor may also be disconnected from the load, e.g., axle 35 via the differential 30.

In other aspects of the disclosure, instead of the processor 415 in the inverter determining whether a malfunction exists, the processor 700 in the SCU 45 makes the determination.

Figure 6:
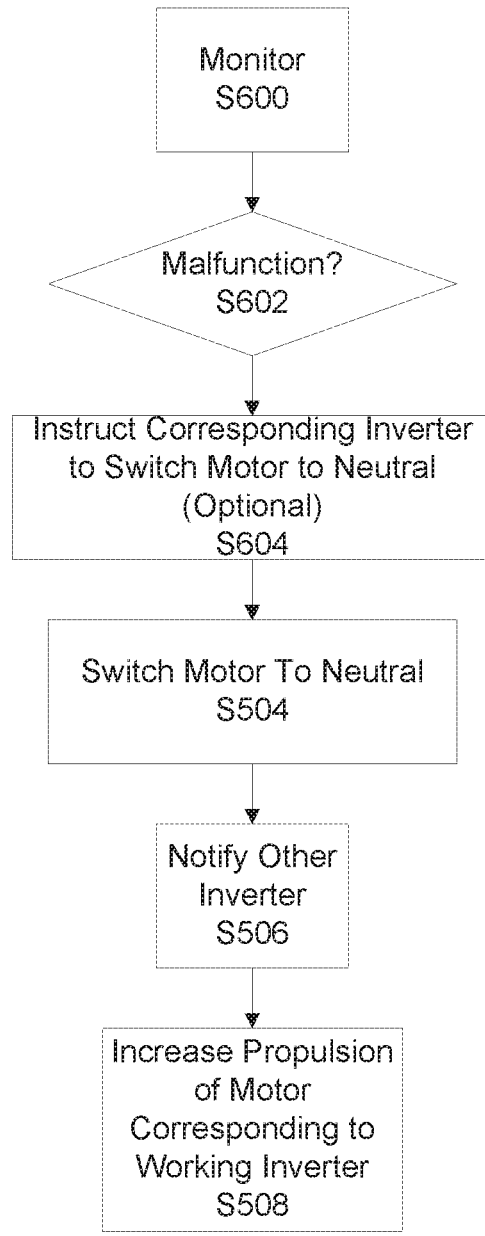
FIG. 6 illustrates a flowchart for responding to inverter malfunction in accordance with aspects of the disclosure.
Figure 7:
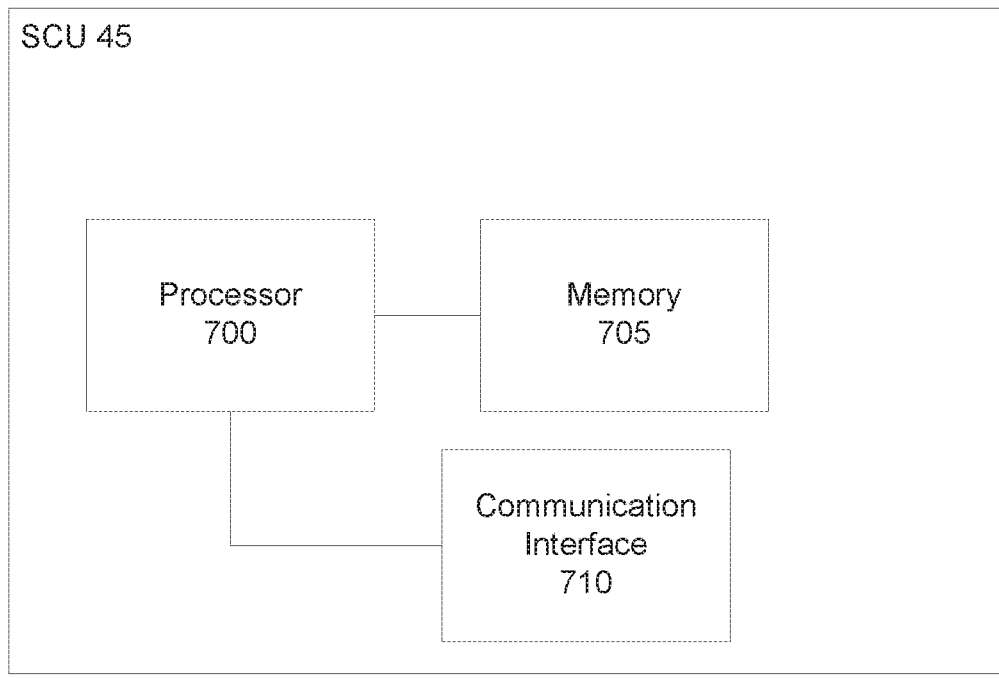
FIG. 7 illustrates a diagram of a system control unit (SCU) in accordance with aspects of the disclosure.

FIG. 6 illustrates a flowchart for responding to an inverter malfunction in accordance with aspects of the disclosure.

At S600, the processor 415 in the inverter monitors whether the inverter 15 is functioning properly (self-monitoring). In one example, the processor 415 may use the voltage sensors 400/420 or current sensors 405 to determine whether there is a failure at the inverter level. A failure at the inverter level may be a DC link fault or any type of ground error. Other errors may be possible such as a bad processor 415. When a fault occurs in the inverter 15, the processor 415 (in the inverter reports the fault) to the processor 700 in the SCU 45 at S602.

Upon receive of the fault condition, the processor 700 issues a command to the inverter that malfunctioned via CAN to isolate the corresponding motor, e.g., switch the motor to neutral, at S604. In other aspects of the disclosure, the inverter 15 may also isolate the corresponding motor without waiting for an instruction from the SCU 45 (omit S604).

In response to the receipt of the command, S504-S506 are performed by the inverter that received the command. Therefore, in accordance with aspects of the disclosure, even if there is a malfunction in either an inverter or motor, the vehicle may be still driven, using the other inverter/motor combination. Similar to above, when an inverter malfunctions, the SCU 45 may issue a system level warning to the operation for display on the dashboard.

In an aspect of the disclosure, the processor 700 in the SCU 45 may interpret a failure to receive a periodic message from the inverter 15 as a failure in the inverter 15 and issue the command when a message is not received within a preset period of time. For example While it has been described herein that a processor in the inverters controls the shifters S, in other aspects of the disclosure, the SCU 45 (processor 700) actuates the shifters S and controls the same.

Figure 8:
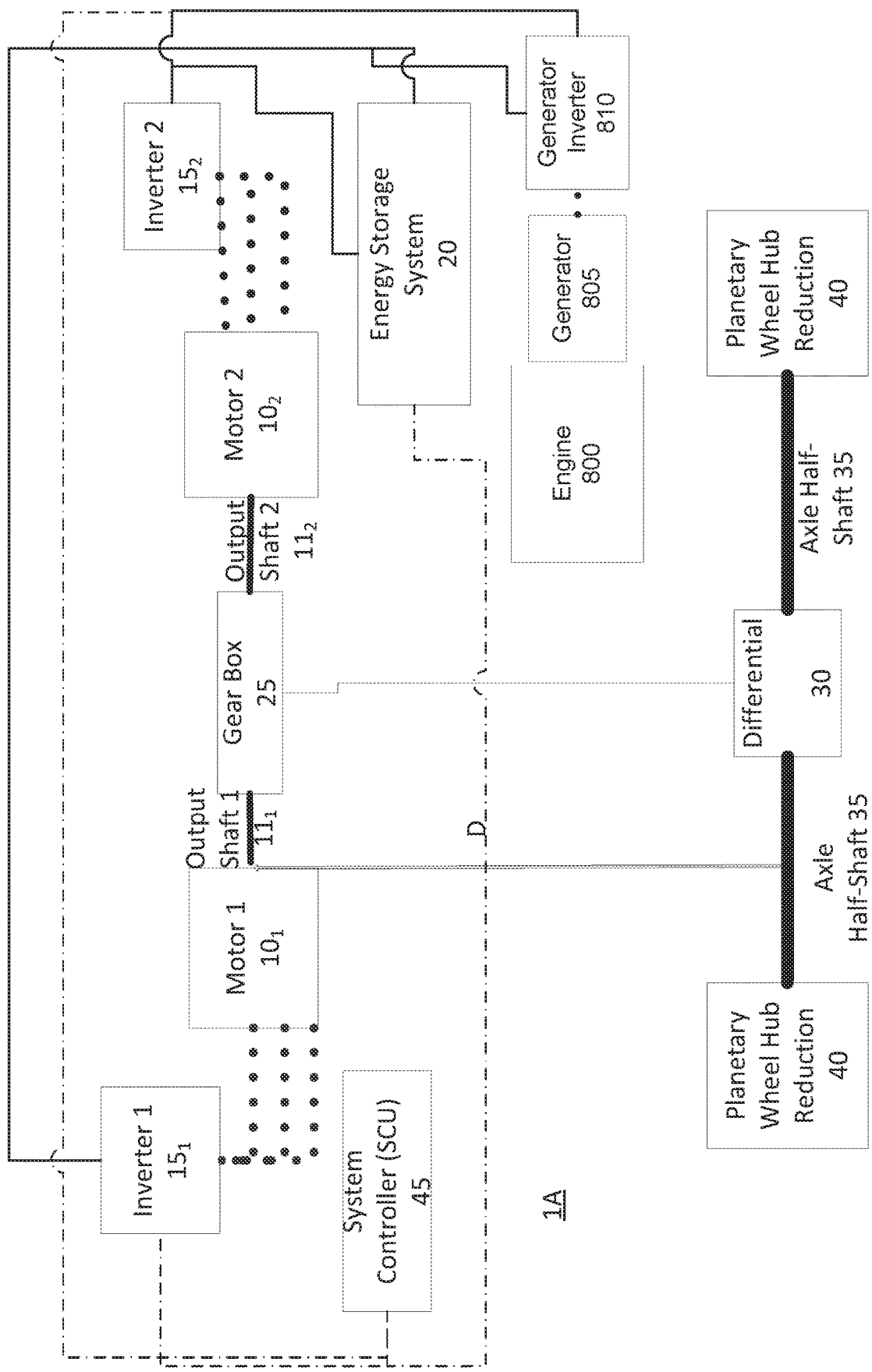
FIG. 8 illustrates a diagram of another system in accordance with aspects of the disclosure.

FIG. 8 depicts a block diagram of an example of a system 1A used in a hybrid electric vehicle. The system 1A is similar to system 1 except system 1A also comprises an engine 800, a generator 805 and a generator inverter 810. The engine 800 (e.g., a prime mover) may be an engine that uses fuel such as gasoline, a diesel or compressed natural gas (CNG) engine (collectively referred to herein as "fuel"). The engine 800 comprises a crankshaft (not shown in the figures). The crankshaft rotates. For example, typical compression ignition engine comprises a plurality of cylinders (e.g., combustion chambers). The combustion chamber is where fuel is combusted. A piston moves within the chamber, e.g., reciprocating motion. The piston transmits a thrust force generated to the crankshaft through one or more connecting rods. The crankshaft converts the reciprocating motion into rotary motion. Each combustion chamber may have an injector. The injector injects fuel into the chamber. Each combustion chamber further has an inlet valve(s) and an exhaust valve(s). Exhaust from the combustion chamber is removed through the exhaust valve(s).

The generator 805 may be an integrated-starter generator ("ISG"). The generator 805 in this example is mechanically connected to the engine 800. The generator may be connected via a belt/pulley system which is connected to a movable shaft of the generator (also not shown in the figures) and to the crankshaft or another shaft. In other aspects of the disclosure, the generator 805 may be connected to the engine 800 in other ways, such as a power take off (PTO) shaft or directly connected to the prime mover.

The generator 805 may be a permanent magnet generator. Other generators may be used. When coupled to the engine 800 (referred to herein as the genset), the generator provides three-phase AC electrical power. The generator 805 may provide a variable frequency AC electrical power. The generator 805 in one example is a high voltage generator.

The generator inverter 810 is electrically connected to the generator 805. The generator inverter 810 receives the three phase AC electric power from the generator 805 and provides a high voltage (DC). The high voltage (DC), e.g., DC link, is coupled to an ESS 20 and inverters 15. The other structures in FIG. 8 and their functionality are the same as in FIG. 1 and described above and will not be described again in detail.

In other aspects of the disclosure, the hybrid electric vehicle may comprise a fuel cell instead of an engine.

As used herein, the term "processor" may include a single core processor, a multi-core processor, multiple processors located in a single device, or multiple processors in wired or wireless communication with each other and distributed over a network of devices, the Internet, or the cloud. Accordingly, as used herein, functions, features or instructions performed or configured to be performed by a "processor", may include the performance of the functions, features or instructions by a single core processor, may include performance of the functions, features or instructions collectively or collaboratively by multiple cores of a multi-core processor, or may include performance of the functions, features or instructions collectively or collaboratively by multiple processors, where each processor or core is not required to perform every function, feature or instruction individually.

Various aspects of the present disclosure may be embodied as a program, software, or computer instructions embodied or stored in a computer or machine usable or readable medium, or a group of media which causes the computer or machine to perform the steps of the method when executed on the computer, processor, and/or machine. A program storage device readable by a machine, e.g., a computer readable medium, tangibly embodying a program of instructions executable by the machine to perform various functionalities and methods described in the present disclosure is also provided, e.g., a computer program product.

The computer readable medium could be a computer readable storage device or a computer readable signal medium. A computer readable storage device, may be, for example, a magnetic, optical, electronic, electromagnetic, infrared, or semiconductor system, apparatus, or device, or any suitable combination of the foregoing; however, the computer readable storage device is not limited to these examples except a computer readable storage device excludes computer readable signal medium. Additional examples of the computer readable storage device can include: a portable computer diskette, a hard disk, a magnetic storage device, a portable compact disc read-only memory (CD-ROM), a random access memory (RAM), a read-only memory (ROM), an erasable programmable read-only memory (EPROM or Flash memory), an optical storage device, or any appropriate combination of the foregoing; however, the computer readable storage device is also not limited to these examples. Any tangible medium that can contain, or store, a program for use by or in connection with an instruction execution system, apparatus, or device could be a computer readable storage device.

A computer readable signal medium may include a propagated data signal with computer readable program code embodied therein, such as, but not limited to, in baseband or as part of a carrier wave. A propagated signal may take any of a plurality of forms, including, but not limited to, electromagnetic, optical, or any suitable combination thereof. A computer readable signal medium may be any computer readable medium (exclusive of computer readable storage device) that can communicate, propagate, or transport a program for use by or in connection with a system, apparatus, or device. Program code embodied on a computer readable signal medium may be transmitted using any appropriate medium, including but not limited to wireless, wired, optical fiber cable, RF, etc., or any suitable combination of the foregoing.

The terminology used herein is for the purpose of describing particular embodiments only and is not intended to be limiting the scope of the disclosure and is not intended to be exhaustive. Many modifications and variations will be apparent to those of ordinary skill in the art without departing from the scope and spirit of the disclosure.

What is claimed is:

1. A system for a vehicle comprising:
   an energy storage system configured to supply power to a DC link;
   a first motor;
   a second motor;
   a first motor inverter coupled to the energy storage system via the DC link and coupled to the first motor, the first motor inverter is configured to receive power from the DC link and provide AC power to the first motor;
   a second motor inverter coupled to the energy storage system via the DC link and coupled to the second motor, the second motor inverter is configured to receive power from the DC link and supply AC power to the second motor;
   a gear box mechanically coupled to the first motor and the second motor,
      the gear box comprising:
         a first shaft coupled to the first motor, the first shaft extending through a first pinion and concentric with a third shaft, where the third shaft extends through a third pinion;
         a second shaft coupled to the second motor, the second shaft extending through a second pinion and concentric with the third shaft, the second pinion having a same tooth count as the first pinion, the third shaft being independent from the first shaft and the second shaft;

a first shifter associated with the first shaft and the first motor; and a second shifter associated with the second shaft and the second motor, the first shifter is configured to selectively engage the first pinion to the first shaft, the third pinion to the first shaft or neither the first pinion nor the third pinion to the first shaft when in a neutral position, wherein when engaged, either the first pinion or the third pinion are rotated in synchronization with the first motor;

the second shifter is configured to selectively engage the second pinion to the second shaft, the third pinion to the second shaft or neither the second pinion nor the third pinion to the second shaft when in the neutral position, wherein when engaged, either the second pinion or the third pinion are rotated in synchronization with the second motor;

the gear box further comprising: a fourth shaft extending through a first gear and a second gear and an other pinion, the first gear meshing with the first pinion, the second gear meshing with the second pinion and the other pinion meshing with the third pinion, the second gear having a same tooth count as the first gear, the other pinion meshing with a fourth gear;

a differential mechanically coupled to the fourth gear and a left axle shaft and a right axle shaft.

2. The system for a vehicle of claim 1, wherein the first shifter and the second shifter are asynchronously controlled such that one of the first shifter and the second shifter is engaged with the respective pinion when the other of the first shifter and the second shifter is in the neutral position.

3. The system for a vehicle of claim 2, wherein the first motor inverter and the second motor inverter communicate with each other, wherein when one of the first shifter and the second shifter is controlled to switch an engagement of a pinion for the associated motor, the corresponding motor inverter to the switch informs an other motor inverter of the first motor inverter and the second motor inverter of the switch.

4. The system for a vehicle of claim 3, wherein, in response to receipt of the information of switching, the other motor inverter of the first motor inverter and the second motor inverter controls a corresponding motor of the first motor and the second motor to increase its output from prior to the switch.

5. The system for a vehicle of claim 4, wherein when one of the first shifter and the second shifter is switched and the one of the first shifter and the second shifter is in the neutral position, the corresponding motor inverter receives a motor speed of the motor associated with the one of the first shifter and the second shifter not being switched from the other motor inverter of the first motor inverter and the second motor inverter.

6. The system for a vehicle of claim 5, wherein in response to receipt of the motor speed, the corresponding motor inverter controls the motor associated with the one of the first shifter and the second shifter being switched to match a speed of a gear being switched based on a preset ratio determined from a tooth count and a speed of the motor not being switched.

7. The system for a vehicle of claim 3, wherein upon completion of the switch, a corresponding motor inverter corresponding to the motor associated with the one of the first shifter and the second shifter being switched informs the other motor inverter of the first motor inverter and the second motor inverter of the completion and an other of the first shifter and the second shifter is switched based on a propulsion command.

8. The system for a vehicle of claim 1, wherein each of the first motor inverter and the second motor inverter comprises at least a voltage sensor and a current sensor coupled to a respective motor and a processor and wherein the processor is configured to detect a failure based on a signal from the at least a voltage sensor and a current sensor.

9. The system for a vehicle of claim 8, wherein when the failure is detected in one or more of the first motor and the second motor, an associated shifter of the first shifter and the second shifter is controlled to move to the neutral position for the motor that was detected as the failure.

10. The system for a vehicle of claim 1, wherein when a failure is detected in one or more of the first motor inverter and the second motor inverter, an associated shifter of the first shifter and the second shifter is controlled to move to the neutral position.

11. The system for a vehicle of claim 1, wherein the first motor and the second motor are positioned a distance from an axle, the distance being greater than a radius of the axle plus a radius of respective motor of the first motor and the second motor plus a preset value.

12. The system for a vehicle of claim 1, wherein the vehicle is an electric vehicle.

13. The system for a vehicle of claim 1, wherein the vehicle is a hybrid electric vehicle, and wherein the system further comprises a generator coupled to a generator inverter, the generator inverter is coupled to the DC link, the generator inverter is configured to receive AC power from the generator and provide DC power to the DC link, the generator is coupleable to an engine.

14. The system for a vehicle of claim 1, wherein the vehicle is a hybrid electric vehicle and wherein the system further comprises a fuel cell, wherein the fuel cell is coupled to the DC link.

15. The system for a vehicle of claim 2, wherein the asynchronously control is used during deceleration such that one motor of the first motor and the second motor is coupled to the fourth gear and maintains a capability of electric regenerative braking during shifting.

16. A hybrid or electric vehicle, comprising:

an energy storage system configured to supply power to a DC link;

a first motor and a second motor;

a first motor inverter coupled to the energy storage system via the DC link and coupled to the first motor, wherein the first motor inverter is configured to receive power from the DC link and provide AC power to the first motor;

a second motor inverter coupled to the energy storage system via the DC link and coupled to the second motor, wherein the second motor inverter is configured to receive power from the DC link and supply AC power to the second motor;

a gear box mechanically coupled to the first motor and the second motor, the gear box comprising:
- a first shaft coupled to the first motor, the first shaft extending through a first pinion and concentric with a third shaft, where the third shaft extends through a third pinion;
- a second shaft coupled to the second motor, the second shaft extending through a second pinion and concentric with the third shaft, the second pinion having a substantially same tooth count as the first pinion, the third shaft being independent from the first shaft and the second shaft;
- a first shifter associated with the first shaft and the first motor; and
- a second shifter associated with the second shaft and the second motor,
- wherein the first shifter is configured to selectively engage the first pinion to the first shaft, the third pinion to the first shaft or neither the first pinion nor the third pinion to the first shaft when in a neutral position, and wherein when engaged, either the first pinion or the third pinion are rotated in synchronization with the first motor;
- the second shifter is configured to selectively engage the second pinion to the second shaft, the third pinion to the second shaft or neither the second pinion nor the third pinion to the second shaft when in the neutral position, wherein when engaged, either the second pinion or the third pinion are rotated in synchronization with the second motor;
- the gear box further comprising: a fourth shaft extending through a first gear and a second gear and an other pinion, the first gear meshing with the first pinion, the second gear meshing with the second pinion and the other pinion meshing with the third pinion, the second gear having a substantially same tooth count as the first gear, the other pinion meshing with a fourth gear;
- a differential mechanically coupled to the fourth gear and a left axle shaft and a right axle shaft.

\* \* \* \* \*